United States Patent
Fitzhugh

Patent Number: 5,324,099
Date of Patent: Jun. 28, 1994

[54] VEHICLE SPRAY SUPPRESSION APPARATUS

[76] Inventor: Lloyd B. Fitzhugh, 1409 Hawkwood, Sherwood, Ark. 72116

[21] Appl. No.: 33,540

[22] Filed: Mar. 18, 1993

[51] Int. Cl.$^5$ .................................................. B60B 7/00
[52] U.S. Cl. .................................... 301/6.1; 301/37.1; 301/37.37; 301/108.1; 301/6.3
[58] Field of Search ................ 301/6.1, 6.3, 6.4, 37.1, 301/37.37, 108.1, 108.4, 5 R

[56] References Cited

U.S. PATENT DOCUMENTS

| | | | |
|---|---|---|---|
| 2,761,530 | 9/1956 | Dawley | 301/6.3 X |
| 2,870,879 | 1/1959 | Gaylord et al. | 301/6.3 X |
| 3,059,730 | 10/1962 | Nickell et al. | 301/6.3 X |
| 4,761,040 | 8/1988 | Johnson | 301/37.1 X |
| 4,932,724 | 6/1990 | Wright | 301/108.4 X |
| 5,222,785 | 6/1993 | Green | 301/108.4 X |

FOREIGN PATENT DOCUMENTS 925539 1/1973 Canada ................ 301/37.37

Primary Examiner—Russell D. Stormer
Attorney, Agent, or Firm—Ray F. Cox, Jr.

[57] ABSTRACT

This invention relates to devices for suppressing the water spray thrown by vehicle tires. The present invention generates an air flow for blocking outward movement of the water spray. Air turbines are attached to the outboard sides of each tire on the vehicle. The air turbines, being rigidly affixed to the hub of each wheel rotate with the wheels and by means of angled vanes disposed in each air turbine generate a flow of air outwardly and perpendicular to the axle. This radial flow suppresses the water spray outboard of each wheel.

6 Claims, 4 Drawing Sheets

VEHICLE SPRAY SUPPRESSION APPARATUS

BACKGROUND OF THE INVENTION

This invention relates to devices for suppressing the water spray thrown by vehicle tires and more particularly to a device which generates an air flow for blocking outward movement of the water spray.

The rotating tires of vehicles traveling on wet surfaces tend to pick up water droplets which are fragmented into a fine mist which tends to impair the visibility of other drivers. This safety hazard is particularly acute in the case of large dual-wheel trucks, particularly tractor-trailer rigs. In addition to the hazards presented to other drivers, the truck driver may also suffer from impaired visibility due to the water spray generated by his own vehicle.

Various solutions to this problem have been suggested. For example, U.S. Pat. No. 4,325,563 issued to Brandon, et al. on Apr. 20, 1982 for "Vehicle Spray Reduction" discloses an apparatus comprising a plurality of vertical, parallel wiggle plates having curved airflow passages for separating the water droplets from the air. The purpose of this apparatus is to collect and direct the water spray to areas of the vehicle where relatively large stable drops of water will concentrate with minimal disturbance from the airflow around the vehicle. A similar concept is disclosed in U.S. Pat. No. 3,834,732 issued to Schons on Sep. 10, 1974 for "Tire Spray Collector Apparatus." Schons discloses a shield member and an apertured collector member which form a closed spray collecting chamber. Water spray collected in the chamber is drained to the ground at a point inward of the wheels to avoid producing further tire spray.

U.S. Pat. No. 4,627,631 issued to Sherman on Dec. 9, 1986 for "Spray Suppressing Mud Flap Assembly" discloses a mud flap which includes an inwardly and rearwardly flared portion. The flared portion is intended to direct spray from the wheels inwardly, thus serving two direct the water spray away from the tires so that further water spray is prevented. The use of deflectors to inhibit water spray from the sides of wheels of vehicles is also disclosed in U.S. Pat. No. 3,632,137 issued to Jossy on Jan. 4, 1972 for "Side Spray Inhibiting Apparatus for Wheeled Vehicles." Jossy discloses an apparatus for inhibiting water spray which comprises a deflector located behind the tires to prevent the water spray from striking the under carriage of the truck. Further, a discharge means is provided for conveying the deflected water to a point inward of the wheels where it is discharged to the ground.

Similarly, U.S. Pat. No. 5,080,397 issued to Metcalf on Jan. 14, 1992 for "Vehicle Tire Water Spray Control System" also embodies the basic concept of directing the water spray to the inside and rear of the vehicle to avoid the generation of further water spray. Metcalf discloses an arrangement of baffles to carry out this purpose. A different approach to directing water away from the tires of a vehicle is disclosed in U.S. Pat. No. 5,074,592 issued to While on Dec. 24, 1991 for "Vehicle Spray Reducing Apparatus." White discloses a spray reducing apparatus for a vehicle comprising a duct arranged in front of the vehicle wheels which directs air towards the ground in front of the wheels so as to deflect any surface water away from the path of the wheel.

SUMMARY OF THE INVENTION

While the prior art has recognized that the control of water spray from the tires of a vehicle must be directed toward the problem of moving water away from the rotating tires and toward the center of the vehicle so that water may be collected and eventually discharged to the rear of the vehicle, there has been little recognition that the airflow around the vehicle may itself be controlled in order to accomplish these objectives. Rather than providing for baffles, flaps and the like, the present invention provides for the generation of radial airflows in planes perpendicular to the wheel axles and outboard of the wheels for directing water spray in toward the center of the vehicle. The radial airflow further serves as a curtain or dam to prevent mist-laden air from flowing outward from the vehicle.

The apparatus of the present invention comprises centrifugal fans attached to the outboard sides of each tire on the vehicle. The centrifugal fans being rigidly affixed to the hub of each wheel rotate with the wheels and by means of vanes disposed in each centrifugal fan generate a flow of air radially outward from the axle of each tire in a plane perpendicular to the axle. This radial flow of air suppresses the water spray outboard of each tire while the exact mechanism by which the apparatus operates is unclear, it appears that the radial flow field around each wheel acts to contain and direct the airflow inward of each wheel such that the water and mist-laden air is confined to the underside of the vehicle where it is directed to the rear of the vehicle and little is allowed to escape to the sides where the greatest hazard occurs to other vehicles. It also appears that containing the water spray to the underside of the vehicle contributes to reduction in the amount of fine mist by the process of coalescing the mist into larger droplets against either the road surface or the underside of the vehicle.

Accordingly, it is an object of the present invention to provide for an apparatus to suppress water spray from the rotating tires of vehicles.

Another object of the present invention is to reduce the transport of water spray to the sides of vehicles and to contain the water spray to the interior and underside of the vehicle.

It is a further object of the present invention to provide for a water spray suppression apparatus which promotes the collection of water spray along the underside of the vehicle and on the road surface away from the tires of the vehicle to further reduce the generation of water spray.

Still another object of the present invention is to provide for a water spray suppression apparatus which utilizes directed airflows and avoids the use of baffles, flaps and similar types of collecting devices.

Further objects and advantages of the present invention will become apparent from the following description of the preferred embodiments in conjunction with the appended drawings.

DETAILED DESCRIPTION OF THE PREFERRED EMBODIMENTS

Figure 1:
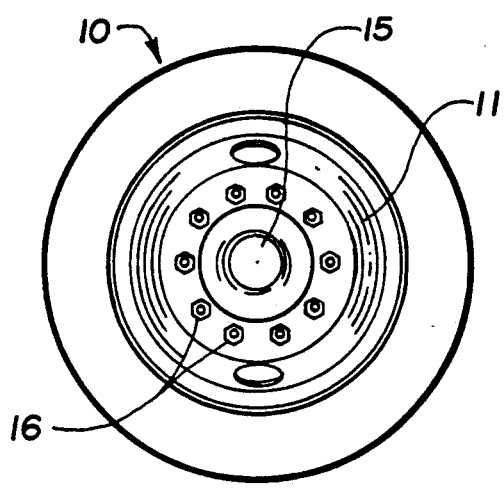
FIG. 1 is an elevation view of a typical front wheel of a tractor-trailer.

The wheels found on tractor-trailer rigs are generally of two types. The first type, generally typical of front wheels on tractors, may be described with reference to FIG. 1 and 1A. This type of wheel, hereinafter described as a front wheel 10, has a dished out hub 11 generally characterized by the hub 11 being disposed outwardly to lie generally in the same plane with the outer surface 12 of the tire 13. A plurality of lug bolts 14 extend outwardly of the hub 11. The lug bolts 14, which are rigidly affixed to the axle 15 indicated herein by the grease cap over the end of the axle, provide the means to receive and attach the hub 11 to the axle 15. Each of the lug bolts 14 receives a lug nut 16.

Figure 2:
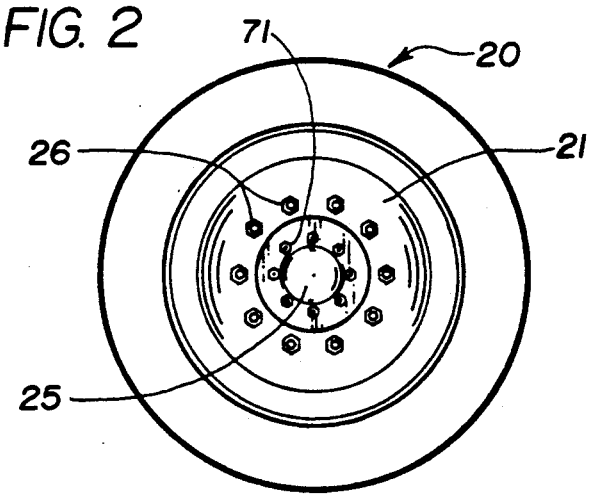
FIG. 2 is an elevation view of a typical rear wheel of a tractor-trailer.
Figure 2A:
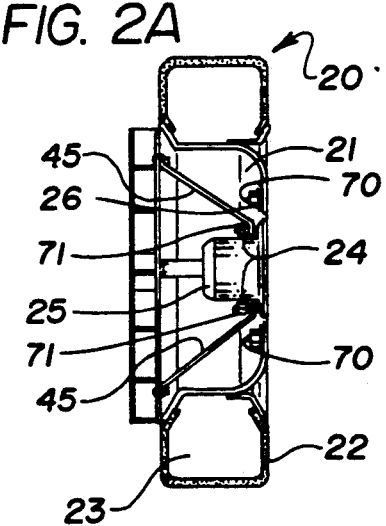
FIG. 2A is a sectional view of the wheel of FIG. 2 showing the embodiment of the present invention adapted to a wheel of that type.

The second type of wheel, referred to hereafter as the rear wheel 20, may be described with reference to FIGS. 2 and 2A. The rear wheel 20 would be typical of the wheels employed on a trailer or on the rear wheels of a tractor. The rear wheel 20 is generally characterized by having a dished in hub 21 such that the surface of the hub 21 generally lies in a plane which includes the rear wall 22 of the tire 23 Lug bolts 24, 70 are rigidly affixed to the axle 25 and provide the means for attachment of the hub 21 to the axle 25. When the hub 21 is received on the lug bolts 24, 70 lug nuts 71, 26 respectively are applied to fasten the hub 21 to the axle 25. From FIGS. 2 and 2A it may be seen that there are two rings of lugbolts known as rim bolts (the outer ring) 70 and hub bolts (the inner ring) 24. In the preferred embodiment of the present invention, the reference to lugbolts and lugnuts with respect to the rear wheel refer to the hub bolts 24, but in other embodiments the rim bolts 70 may be used in identical fashion.

The varying shapes of the hubs 11, 21 of the front wheel 10 and the rear wheel 20 respectively require two physical embodiments of the present invention. However, the mechanism of operation of the two embodiments are identical and the variations in physical form are solely for the purpose of adapting the two embodiments to the configuration of the front wheel 10 and the rear wheel 20. The two physical embodiments of the present invention will be referred to as the front unit 30 and the rear unit 40.

Figure 3:
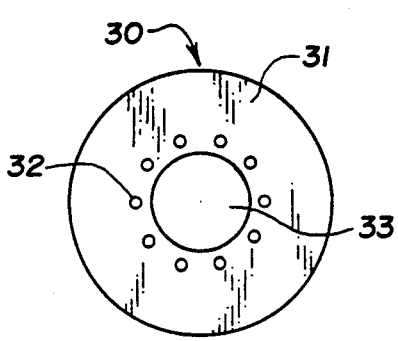
FIG. 3 is an elevation of the embodiment of the present invention adapted to a front wheel.
Figure 3A:
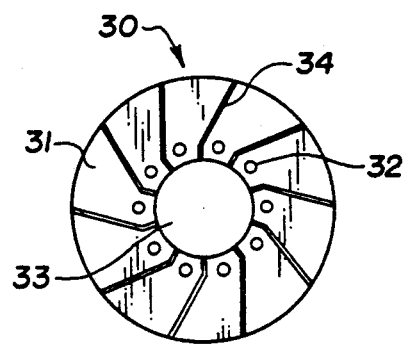
FIG. 3A is an elevation view of the rear of the embodiment of FIG. 3.
Figure 3B:
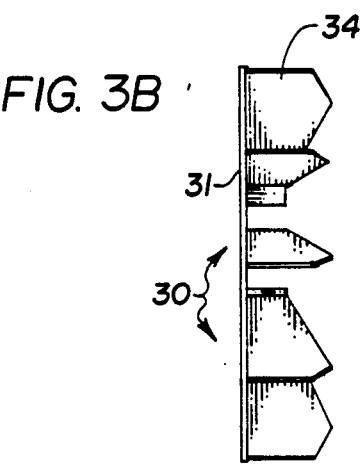
FIG. 3B is a plan view of the side of the embodiment of FIG. 3.
Figure 4B:
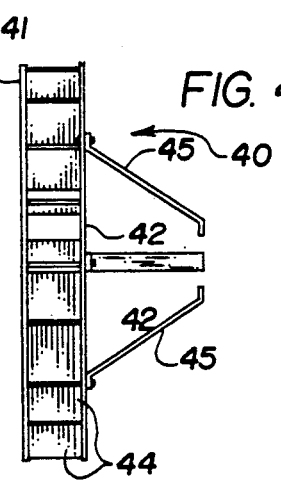
FIG. 4B is a plan view of the side of the embodiment of FIG. 4.
Figure 4:
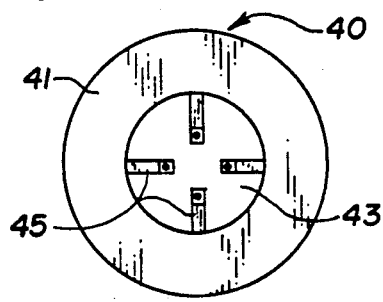
FIG. 4 is an elevation view of the embodiment of the present invention adapted to the rear tire of FIG. 2.
Figure 4A:
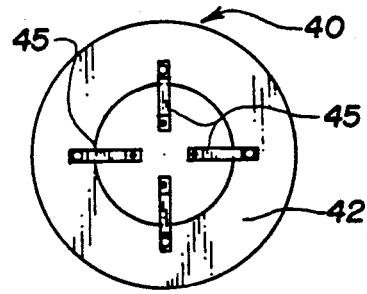
FIG. 4A is an elevation view of the rear of the embodiment of FIG. 4.
Figure 5:
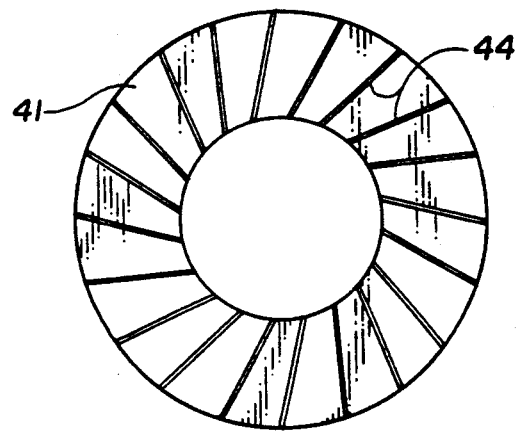
FIG. 5 is a sectional view of the embodiment of FIG. 4.

The front unit 30 is described with reference to FIGS. 3, 3A and 3B. The front unit 30 comprises a support plate 31 which contains a plurality of lug bolt openings 32 an a central air inlet 33. To the support plate 31 are attached a plurality of radial angled vanes 34. The vanes 34 are angled so that rotation of the front wheel 10, while the tractor-trailer is in forward motion, causes the front unit 30 to rotate likewise so that the vanes 34 generate an airflow radially outward from the front unit 30. The vanes 34 are disposed between the support plate 31 and the hub 11. As shown in FIG. 3B, the vanes 34 are shaped to conform to the hub 11.

In use the front unit 30 is positioned on the front wheel 10 such that the lug bolts 14 protrude through the respective openings 32 in the support plate 31. Supplementary lug nuts 17 are employed to secure the front unit 30 to the hub 11 of the front wheel 10.

The rear unit 40 is described with reference to FIGS. 4, 4A, 4B and 5. The rear unit 40 comprises a support plate 41 and a central air inlet 43. To the support plate 41 are attached a plurality of angled radial vanes 44. The vanes 44 are angled so that rotation of the rear wheel 20, while the tractor-trailer is in forward motion, causes the rear unit 40 to rotate likewise so that the vanes 44 generate an airflow radially outward from the rear unit 40. Unlike the front unit 30, the rear unit 40 also includes a flow directing plate 42 disposed so that the vanes 44 are disposed between the support plate 41 and the flow directing plate 42. This arrangement is dictated by the dished-in configuration of the rear wheel 20. Support struts 45 are attached to the rear of the flow directing plate 42. The support struts 45 are angled such that tabs 46 on the inward ends of the support struts 45 are disposed in proximity to the lugbolts 24 of the rear wheel 20 such that the lugbolts 24 protrude through respective openings 47 in the tabs 46. The lugnuts 71 may be removed from the lugbolts 24 prior to placing the struts in position and afterward refastened to the lugbolts 24 in order to secure the rear unit 40 to the rear wheel 20.

Figure 1A:
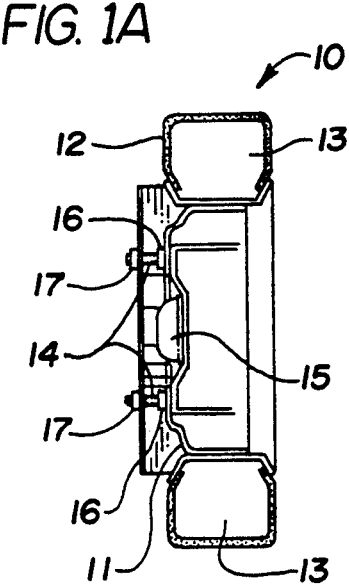
FIG. 1A is a section through the front wheel of FIG. 1 showing the embodiment of the present invention adapted for installation on the type of wheel shown in FIG. 1.
Figure 6:
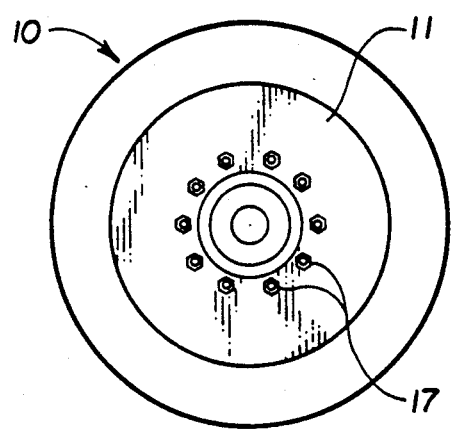
FIG. 6 is an elevation view of the embodiment of FIG. 3 in place on a front tire.
Figure 7:
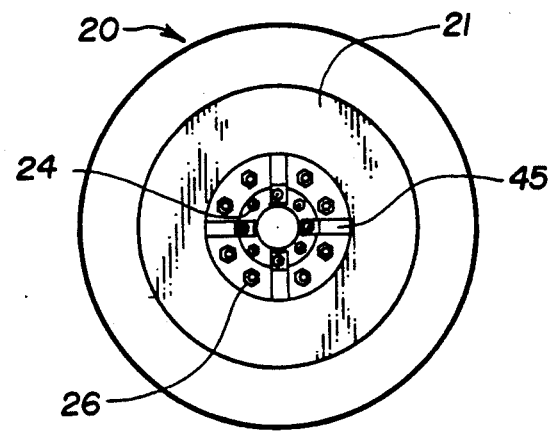
FIG. 7 is an elevation view of the embodiment of FIG. 4 in place on a rear wheel.

FIGS. 1A and 6 show the front unit 11 in place on the front wheel 10. FIGS. 2A and 7 show the rear unit 21 in place on the front wheel 20. Operation of the units 11, 21 are described with reference to FIGS. 8 and 9.

Figure 8:
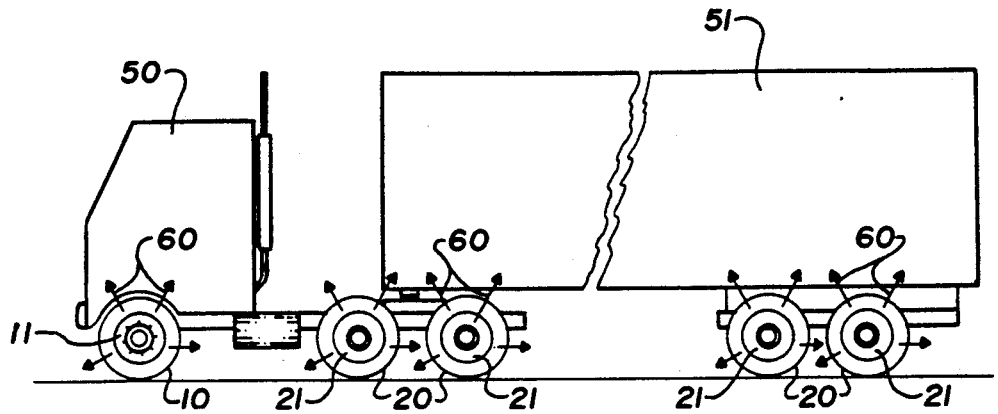
FIG. 8 is an elevation view of a tractor-trailer with the apparatus of the present invention in place on each wheel showing the radial airflow generated about each wheel.

FIG. 8 is an elevation view of a typical tractor-trailer rig made up of a tractor 50 and trailer 51. Front wheels 10 as described herein are typically found on the front axle of the tractor 50. Rear wheels 20 as described herein are typically found on the rear axle of the tractor 50 and on all axles of the trailer 51. In operation all wheels of the tractor 50 and trailer 51 are fitted with front units 11 or rear units 21 of the present invention, respectively. As previously described, forward motion of the tractor-trailer and the resulting rotation of the wheels 10, 20 produce corresponding rotation of the front units 11 and the rear units 21, which in turns results in the generation of a radial flow of air outward from the respective axles of the wheels 10, 20. The radial air flow is designated in FIG. 8 by radial arrows 60. The radial air flow represented by the radial arrows 60 is generated in a narrow plane perpendicular to the respective axles of the wheels 10, 20 and slightly outboard of the outermost parts of the wheels 10, 20.

Figure 9:
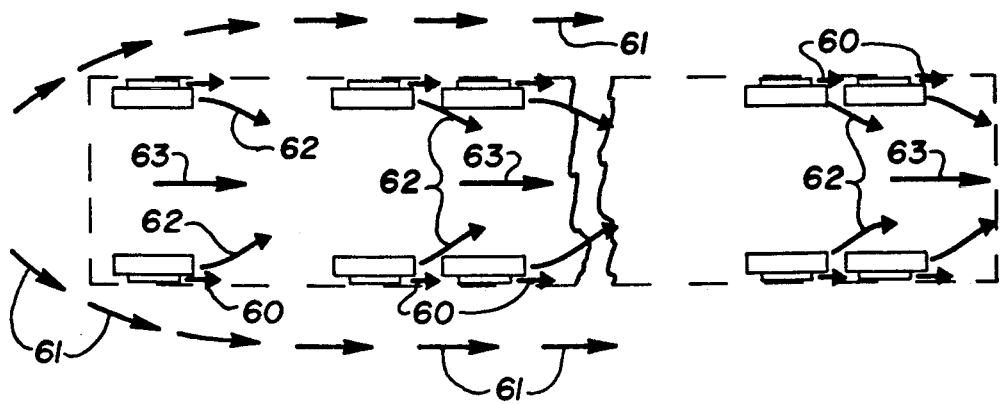
FIG. 9 is a sectional plan view showing a tractor-trailer with the typical airflow around the trailer and from each tire to the inward underside of the trailer.

The effect of the radial air flow 60 is described with reference to FIG. 9. The air flow around the tractor-trailer is shown by the arrows 61. Water spray 62 generated by the wheels 10, 20 would, in the absence of the radial air flow 60 of the present invention, be entrained in the air flow 61 into the space surrounding the tractor-trailer and thus into the path and line of vision of nearby vehicles. With the present invention, however, the radial flow 60 generated by the front units 11 and the rear units 21 tends to prevent the water spray 62 generated by the wheels 10, 20 from being entrained in to the ambient air flow 61. While other mechanisms may be at work, it is hypothesized that the water spray 62 is entrained into the air flow 63 which passes under the tractor-trailer and either exits at the rear of the trailer 51 or impinges on the road surface away from the vicinity of the wheels 10, 20 or impinges the underside of the trailer 51 where it collects and eventually exits the rear of the trailer 51. In respect to certain types of trailer, the overhang of the trailer over the wheels or other aspects of the airflow may be such as to prevent adequate impingement of the water spray on the underside of the vehicle or on the road surface. In such a case an alternative embodiment of the present invention would include fenders or other impingement devices located over or around the wheels such that the water spray is collected from the air turbines of the present invention.

While the present invention has been described with respect to a preferred embodiment, it should be regarded as exemplary and not by way of limitation to the full scope of the invention as set forth in the appended claims.

What is claimed is:

1. Spray reducing apparatus for a vehicle having at least one wheel comprising a hub fastened to an axle of said vehicle by lug bolts and lug nuts, a tire encircling said hub and mounted thereto, said hub being characterized by a hub radius from said axle to an outermost circumference of said hub, comprising:
   (a) airflow generating means for generating an airflow radially outward from said axle of said wheel of said vehicle in a narrow plane outboard of said wheel and substantially perpendicular to said axle, comprising a centrifugal fan rotating coaxially with said wheel, said centrifugal fan further comprising a flat support plate spaced outboard of said wheel and perpendicular to said axle and characterized by a support plate radius at least equal to said hub radius, and a plurality of vanes attached to said support plate and disposed between said support plate and said wheel in planes parallel to said axle of said wheel and further disposed such that rotation of said wheel acts to generate said radial airflow; and
   (b) attachment means for attaching said airflow generating means to said wheel.

2. The apparatus of claim 1 wherein said support further comprises at least one inlet for admitting air to said vanes.

3. The apparatus of claim 2 wherein said inlet is a substantially circular opening disposed in the center of said support plate.

4. The apparatus of claim 3 wherein said attachment means comprises:
   (a) a plurality of holes in said support plate aligned with the lug bolts of said wheels and sized such that, when said support plate is disposed in a spaced relationship with said wheel, said lug bolts extend outwardly from said support plate; and
   (b) a plurality of supplementary lug nuts applied to said lug bolts by which said support plate is rigidly affixed to said wheel.

5. The apparatus of claim 3 wherein said attachment means comprises:
   (a) a flow directing plate attached to said vanes inboard of said vanes;
   (b) a plurality of struts attached to said flow-directing plate and each of said struts having an inboard end aligned with the lug bolts of said wheel and each of said inboard ends having a hole sized to pass over said lug bolts; and
   (c) a plurality of lug nuts applied to said lug bolts by which said struts are rigidly affixed to said wheel.

6. The apparatus of claim 4 wherein said vanes conform substantially to the contours of said wheel.

* * * * *